United States Patent [19]
Zimmerman et al.

[11] Patent Number: 5,490,237
[45] Date of Patent: Feb. 6, 1996

[54] PAGE PRINTER HAVING IMPROVED SYSTEM FOR RECEIVING AND PRINTING RASTER PIXEL IMAGE DATA FROM A HOST COMPUTER

[75] Inventors: Gary D. Zimmerman; Frank J. Riskey, both of Boise, Id.

[73] Assignee: Hewlett-Packard Company, Palo Alto, Calif.

[21] Appl. No.: 54,769

[22] Filed: Apr. 26, 1993

[51] Int. Cl.⁶ ............................................. H04N 1/21
[52] U.S. Cl. ............................................. 395/115; 395/114
[58] Field of Search ................................... 395/115, 116; 358/296; 364/519

[56] References Cited

U.S. PATENT DOCUMENTS

| | | | |
|---|---|---|---|
| 4,953,103 | 8/1990 | Suzuki | 364/519 |
| 5,146,545 | 9/1992 | Maruyama | 395/115 |
| 5,146,547 | 9/1992 | Beck et al. | 395/116 |
| 5,191,430 | 3/1993 | Sudoh et al. | 358/296 |
| 5,218,670 | 6/1993 | Sodek, Jr. et al. | 395/115 |
| 5,220,645 | 6/1993 | Nakajima | 395/115 |

*Primary Examiner*—Mark R. Powell
*Assistant Examiner*—Steven P. Sax

[57] ABSTRACT

A page printer is connected to a computer by a standard input/output interface that enables a predetermined data transfer rate of raster pixel image data. The page printer includes a print engine for printing raster pixel data on a page at a constant rate that is greater than the predetermined data transfer rate. The printer's processor allocates a portion of printer RAM as a buffer for receiving raster pixel image data from a host computer. The RAM buffer is sized to hold an initial quantity of raster pixel image data that comprises a portion of a page. The printer's processor causes the print engine to commence printing of a page when the RAM buffer contains the initial portion of received raster pixel image data. The predetermined data transfer rate then enables transfer to RAM of sufficient additional raster pixel image data to enable the print engine to complete printing of the page without stopping—after the initial quantity of raster pixel data has been printed.

9 Claims, 3 Drawing Sheets

PAGE PRINTER HAVING IMPROVED SYSTEM FOR RECEIVING AND PRINTING RASTER PIXEL IMAGE DATA FROM A HOST COMPUTER

FIELD OF THE INVENTION

This invention relates to page printers, and more particularly, to a page printer that receives raster data via a standard input/output interface, the page printer employing a limited-size raster buffer, and while enabling its print mechanism to operate with high efficiency.

BACKGROUND OF THE INVENTION

Most laser printers receive data to be printed from a host computer in the form of a control language over a standard interface. The control language data stream includes print function commands with interspersed print data. The laser printer responds by converting the received data stream into a list of simple commands, called display commands which describe what must be printed. The printer processes the display commands and renders the described objects into a raster bit map. This procedure generally requires a full page raster bit map memory, as the same memory is used for succeeding pages.

Many methods have been implemented to reduce the amount of required memory in a laser printer. Some methods require an analysis of the incoming signal stream to determine if the data contained therein (e.g. raster graphics data) exceeds a threshold of available storage in the printer's video buffer. In such case, a compression technique is employed to compress the raster image data so as to enable more efficient use of the available raster buffer space. In U.S. patent application Ser. No. 07/940,111, entitled "Page Printer Having Adaptive Data Compression for Memory Minimization", of Campbell et al, a number of compression techniques are applied to an input data flow, depending upon which technique provides a greater level of compression. In U.S. patent application Ser. No. 07/939,795, entitled "Page Printer Having Automatic Font Compression" to Zimmerman et al, a page printer is described that has the ability to determine when a received font will require an excessive amount of buffer memory. In such a case, the printer compresses the font data to again enable more efficient use of available raster buffer space.

The use of control languages to enable data transfers between host computers and laser printers is widespread and must be accommodated on a commercial laser printer if that printer is to appeal to a large customer base. Such control language data is transferred to the laser printer over a standard, input/output (I/O) interface that exhibits a rather slow data transfer rate. One known standard interface is called the "Centronics" interface and enables data transfers to occur at a rate of approximately 100k bytes per second. Using that interface, a laser printer converts an incoming command language data stream into a "page intermediate" form (consisting of display commands) which is then converted to raster image data. The raster image data conversion process causes the intermediate page representation to be divided into a number of strips, with groups of the strips being sequentially processed to raster pixel data (video data for the print engine). The print engine is only started after an initial group of strips have been converted to raster pixel data. At this time the laser print engine prints the data and continues at a fixed speed, until all strips have been printed. If new rasterized data is not available at a rate that keeps up with the print engine's operation, a print "overrun" occurs and the page is not printable. As a result, considerable time is lost due to the substantial preprocessing which must occur before the print engine is started.

Some page printers employ a high speed page printing technique termed the "Sleek" mode that avoids the substantial preprocessing that occurs when print data is transferred using a print control language. In the Sleek mode, the host computer converts user input data into a full raster pixel image and then feeds that raster image as pixel data, over a special interface at a high data transfer rate. For instance, certain prior art page printers employ a separate video port that accepts video raster image data at a multi-megabit per second rate. While such printers provide highly efficient print rates, the costs inherent in the separate video ports on both the printer and the host and circuitry for handling data over those ports adds substantially to the system's cost. Nevertheless, the Sleek mode does enable a substantial increase in print speed of a laser page printer.

Accordingly, it is an object of this invention to provide a low cost page printer that has the ability to accept print data configured in a control language format or in raster format.

It is another object of this invention to provide an improved page printer that is enabled to accept both control language print data and Sleek mode print data over a standard input/output printer interface.

It is still another object of this invention to employ standard input/output interface of a page printer to receive Sleek mode data, the page printer still having a buffer memory size that is minimal and cost effective.

SUMMARY OF THE INVENTION

A page printer is connected to a computer by a standard input/output interface that enables a predetermined data transfer rate of raster pixel image data. The page printer includes a print engine for printing raster pixel data on a page at a constant rate greater than the predetermined data transfer rate. The printer's processor allocates a portion of printer RAM as a buffer for receiving raster pixel image data from a host computer. The RAM buffer is sized to hold an initial quantity of raster pixel image data that comprises a portion of a page. The printer's processor causes the print engine to commence printing of a page when the RAM buffer contains the initial portion of received raster pixel image data. The predetermined data transfer rate then enables transfer to RAM of sufficient additional raster pixel image data to enable the print engine to complete printing of the page without stopping—after the initial quantity of raster pixel data has been printed.

DETAILED DESCRIPTION OF THE INVENTION

Figure 1:
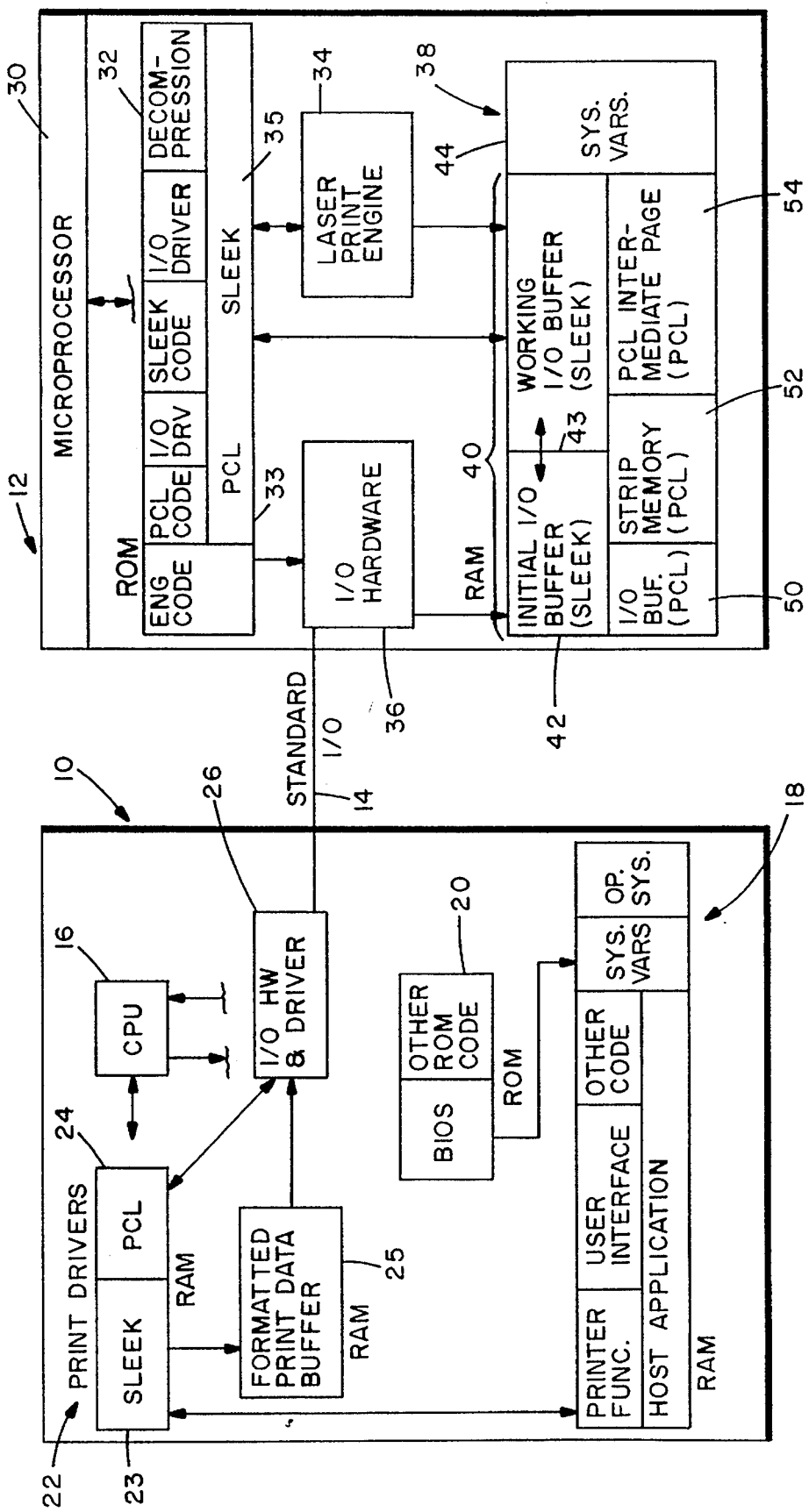
FIG. 1 is a block diagram showing internal aspects of both a host computer and an attached page printer, the host computer and page printer being connected over a standard I/O interface.

Referring to FIG. 1, a host computer 10 is connected to a printer 12 via a standard I/O interface 14. For the purposes of this description, it will be assumed that host computer 10 is a personal computer and that printer 12 is a laser printer. It will be further assumed that host computer 10 is connected to printer 12 via a standard I/O interface 14 of the "Centronics" type that enables data transfers at a rate of approximately 100,000 bytes per second.

Host computer 10 includes a central processing unit 16 and a random access memory (RAM) that is segmented into a number of portions. RAM portion 18 contains software code for controlling the host computer's application, printer driver functions, and a user interface. RAM portion 18 also includes system variables and the host's operating system. A read only memory (ROM) 20 includes firmware for controlling the basic input/output system (BI/OS) and code for controlling other host functions. RAM portion 22 includes print driver software for enabling host computer 10 to operate in either a Sleek mode 23 or a PCL mode 24. In this case, PCL means "Printer Control Language" which is a standard, widely-used driver for laser page printers. A further portion 25 of RAM is set aside to act as a buffer to contain raster image data that has been formatted by Sleek driver 23 and is ready for transfer to laser printer 12 via I/O hardware and driver module 26. PCL driver 24, under control of CPU 16, configures and feeds commands and data for a page directly to I/O hardware and driver module 26 for transfer to printer 12. Thus, both Sleek and PCL data is fed through the same standard interface module 26 and is passed over I/O interface 14 to printer 12.

Within printer 12, a microprocessor 30 controls the overall functioning of the printer and its sub-components. A read only memory (ROM) 32 contains firmware code for controlling laser print engine 34 in both a PCL mode 33 and a Sleek mode 35. PCL mode 33 firmware enables received PCL-configured code to be converted to a page intermediate form and then formed into a raster configuration for printing by laser print engine 34. The I/O driver portion of PCL mode 33 controls I/O hardware module 36 to properly respond to received PCL commands and data.

Sleek mode firmware 35 includes a Sleek code section that enables allocation of a portion of RAM 38 as an I/O buffer 40; an I/O driver control section and a decompression algorithm section for decompressing compressed raster data that is received from host computer 10.

I/O buffer 40 receives raster-formatted data from I/O hardware 36 and stores it temporarily prior to feeding it to print engine 34. I/O buffer 40 includes an initial I/O buffer portion 42 whose size is determined by a threshold value (indicated by line 43) received from host computer 10. A further RAM portion 44 includes system variables for printer 12. RAM portions 50, 52 and 54 are sections of RAM 38 reserved for use when in the PCL mode. Portion 50 serves as an I/O buffer; portion 52 as a storage for page strips created during PCL processing; and PCL intermediate portion 54 is used during PCL mode page processing actions, preparatory to feeding raster data to laser print engine 34.

Figure 2:
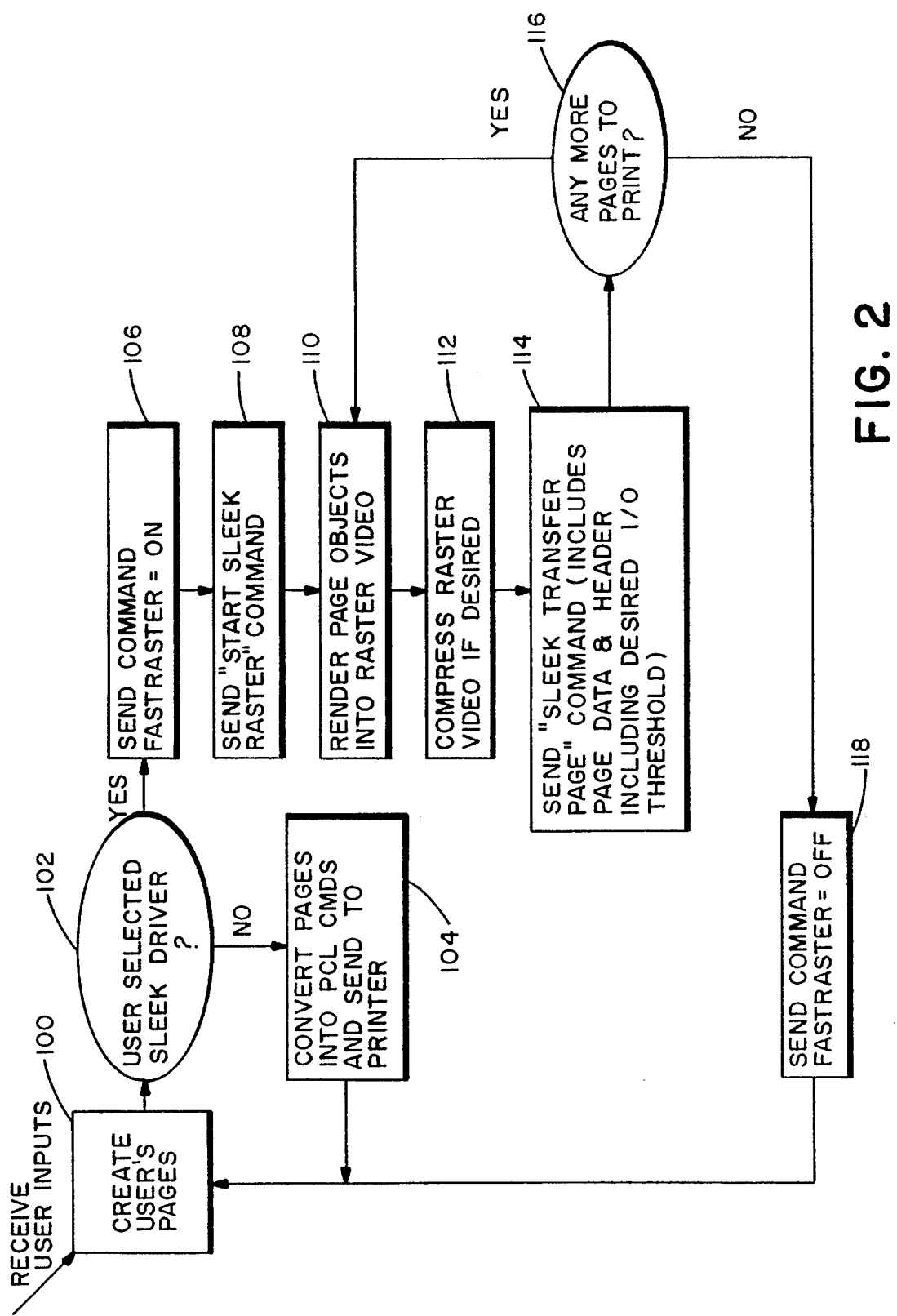
FIG. 2 is a high level flow diagram illustrating the operation of the host computer in carrying out the invention.
Figure 3:
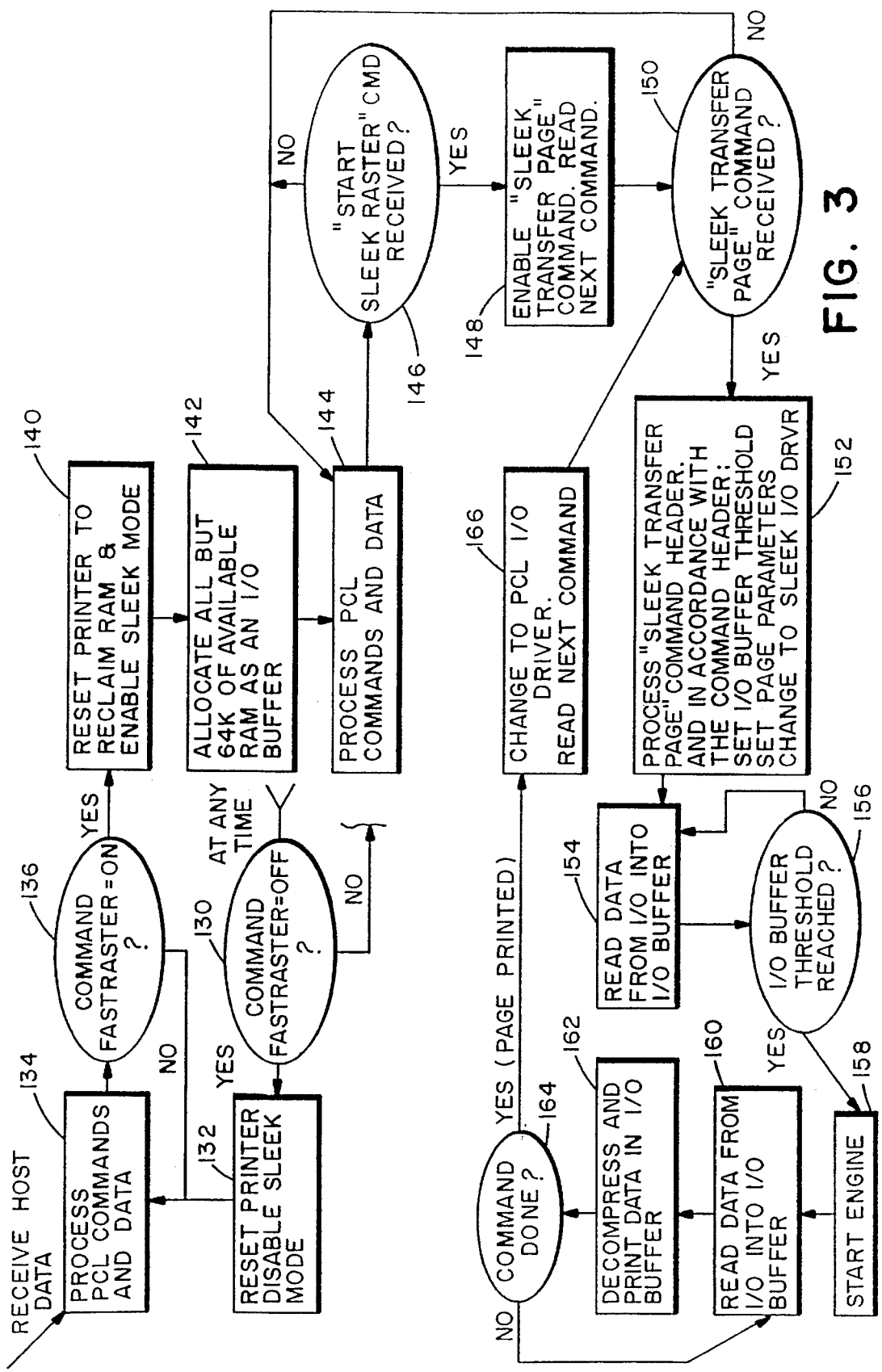
FIG. 3 is a high level flow diagram illustrating the operation of the page printer in carrying out the invention.

The logic flow diagrams of FIGS. 2 and 3, will now be used to describe how host computer 10 and printer 12 cooperate via standard I/O interface 14, to handle both Sleek mode and PCL mode data transfers. Turning first to FIG. 2, host computer 10 receives user inputs and creates pages of a document using those inputs (box 100). If printer 12 is provided with both PCL and Sleek modes, the user may select either mode. Assuming the user does select the PCL mode (see decision box 102), the pages created by the user are converted into PCL commands and are sent to printer 12 via standard I/O 14 in the normal manner (box 104). If the user selects the Sleek mode, host computer 10 sends a command "Fastraster=ON" to printer 12 (box 106), causing printer 12 to prepare to received Sleek mode data. Then, a "Start Sleek Raster" command is produced (box 108), causing the Sleek driver within RAM portion 22 to commence operation. The code contained therein selects a page created by the user and renders that page into a raster video image (box 110). The raster video image may be compressed, if desired, (box 112) to enable more efficient data transfer over standard I/O 14. Such compression may take the form of run-length coding, white line removal or another relatively simple compression technique.

At the termination of any compression action, a "Sleek Transfer Page" command (box 114) is transmitted via standard I/O 14 to printer 12. That command includes both raster page data and a header that sets a threshold defining an amount of working I/O buffer 40 to be allocated for use as initial buffer 42. That threshold value sets the size of initial buffer 42 which must be filled by raster image data before laser print engine 34 can be turned on. In addition, the headers also define a height, width and positioning of data on the page and whether the page data has been compressed. The specification of the height, width and positioning of print data is an additional form of compression as it eliminates the need to send "white" area data designating top, bottom and side margins.

If more pages are left to print after a page of raster image data has been transferred to printer 12, the procedure cycles back to box 110 and repeats. If no further pages are left to print, a "Fastraster=OFF" command is sent to printer 12, thereby causing its reversion to the PCL mode (a default condition).

Turning to FIG. 3, the manner in which printer 12 responds to the Sleek mode will be described. Initially, it is assumed that a "Fastraster=OFF" command has been received (decision box 130). Under such condition, printer 12 disables the Sleek mode (box 132) and processes data received over standard I/O 14 as PCL commands and associated data (box 134). If, however, a "Fastraster=ON" command is received (decision box 136), printer 12 enters a reset mode (box 140), reclaiming RAM and enabling the Sleek mode. Initially, all but a small portion of available RAM is allocated for use as an I/O buffer, but it is to be understood that this action is preliminary and that all allocated RAM may not be utilized for I/O buffer purposes (box 142).

Box 144, indicating a requirement to process PCL commands and data, is inserted in the flow diagram at this point to enable a return to PCL in the event that a Sleek transfer action is discontinued by a Fastraster OFF signal. Assuming the Sleek mode continues, the system awaits the receipt of a "Start Sleek Raster" command from computer 10 (decision box 146). If no such command is received, the procedure recycles to process PCL commands and data (box 144). If a "Start Sleek Raster" command is received, a "Sleek Transfer Page" operation is enabled (box 148). A next command is then read in and a determination made as to whether that command is a "Sleek Transfer Page" command (decision box 150).

If any command other than a "Sleek Transfer Page" command is received, the printer resets to handle PCL commands and data. If, however, a Sleek Transfer Page command is received, the command's header portion is processed (box 152) and a portion of the RAM that was allocated as an I/O buffer is set aside to act as an I/O buffer in accordance with a threshold value included in the header. That threshold value sets the amount of I/O buffer that is to be filled by raster image data before laser print engine 34 is turned on to print the raster image data. That threshold is set and takes into account the speed of operation of laser print engine 34. The threshold, once reached assures that sufficient raster image data is present in RAM buffer so that when laser print engine 34 finishes printing that buffered data, sufficient additional data will be available (or have been received) over standard I/O 14 (at its predetermined data transfer rate) to enable the print engine to print the remainder of raster image for the page without stopping.

As an example, assume that laser print engine can print 4 pages per minute and requires 12 seconds per page for its printing action, the other three seconds being employed to move the page through the print station and into an output tray. Further assume that the print resolution is approximately 8.0 million pixels per page. Laser print engine 34 will thus require approximately 83,000 bytes per second to maintain a constant print rate. If the data transfer rate over standard I/O interface 14 is approximately 100,000 bytes per second, then the I/O buffer threshold value is set at a low value to enable a minimal amount of RAM to be employed as a buffer for raster image data (e.g., 100,000 bytes). This enables a small portion of the raster image to be received, buffered and available for transfer to laser print engine 34 once it commences printing.

If, by contrast, the standard I/O interface has a slower data transfer rate (e.g. 30 kilobytes per second), then sufficient data must be buffered in I/O buffer RAM portion 40 to assure that, once it is printed by print engine 34, that additional data is available at the working speed of laser print engine 34 to enable completion of the page. In this case, I/O buffer portion 40 would have its threshold set so as to accommodate a substantial portion of the raster image in initial I/O buffer portion 42, leaving little additional raster image data to be directly received over standard I/O 14 during the print action. An initial I/O buffer 42 threshold of 400,000 bytes would allow 40% of the page to be stored in buffer, prior to starting print engine 34. In this example, a data transfer rate of 50k bytes per second is assumed.

The printer's I/O buffer threshold is set by host computer 10 in accordance with the known print speed of laser print engine 34, the rate that the host computer expects that data will be transferred over standard I/O 14 and the level of resolution being employed by laser print engine 34 (e.g. 300 dpi, 600 dpi, etc.). Host computer 10 preferably implements the setting of the I/O threshold by precalculating a table that is automatically accessed upon an initial system configuration operation performed by host computer 10.

Returning to FIG. 3, in addition to setting the I/O buffer threshold in accordance with a command from host computer 10, printer 12 sets page parameters in accordance with header instructions and changes to the Sleek I/O driver mode (box 152). At this stage, data is read into the I/O buffer (box 154) until the I/O buffer threshold is reached (decision box 156). Once the buffer threshold is reached, laser print engine 34 is started (box 158) and printing commences of the data stored in the I/O buffer. During this time, data continues to be read from I/O hardware 36 into the I/O buffer (box 160) where it is decompressed (if necessary) and printed. Printing occurs of this later data only after the raster data initially loaded into the RAM buffer has been printed. Here it can be seen that the amount of later-received raster image data must enable the print engine to finish the page (box 162). More specifically, a condition where the print engine expects data, but no data is available—must be avoided.

Until the command (i.e., a page) is finished, the procedure recycles. Once the command is finished (i.e. a page has been printed), the printer reverts to the PCL state and implements the PCL I/O driver (box 166). This condition continues until a "Sleek Transfer Page" command is next received, at which point the Sleek mode is re-enabled. Otherwise, incoming data over standard I/O 14 is handled as standard PCL data and is printed accordingly.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. Apparatus including a page printer for printing raster pixel image data on a page, said page printer connected to a computer by a standard input/output (I/O) interface that enables an interface data transfer rate of raster pixel image data, said computer assembling and transferring said raster formatted pixel image data in either compressed or uncompressed form, to said printer, said page printer comprising:

a print engine for printing said raster formatted pixel image data on a page at a constant rate;

a random access memory (RAM) coupled to said print engine; and processor means coupled to said RAM and said print engine, for allocating a portion of said RAM as a buffer for said raster formatted pixel image data received from said computer via said standard I/O interface when said constant rate of said print engine is greater than said interface data transfer rate, said buffer sized to hold an initial quantity of said raster formatted pixel image data comprising a portion of a page, said processor means controlling said print engine to commence printing of a page from data in said buffer using said initial quantity only when said buffer contains at least said initial quantity, said interface data transfer rate enabling transfer to RAM of sufficient additional said raster formatted pixel image data to enable said print engine to complete printing of said page therefrom without stopping, after said initial quantity of said raster formatted pixel has been printed.

2. The apparatus as recited in claim 1, wherein said processor means allocates said portion of said RAM as a buffer in response to a signal from said computer, said signal including a value that specifies a size of said buffer.

3. The apparatus as recited in claim 2, wherein said value specifies a size for said buffer that is minimally required to enable non-stop printing of a page by said print engine, given said interface data transfer rate.

4. The apparatus as recited in claim 1, further comprising:

control means for print procedures, a first print procedure controlling said processor means to convert printer control language data received via said standard I/O interface into raster formatted pixel image data, and a second print procedure for controlling processor means to respond to raster formatted pixel image data received via said standard I/O interface, a signal from said processor means determining selection of at least one said print procedure.

5. A method for causing a laser printer to print raster formatted pixel image data received, in either compressed or uncompressed form, from a computer connected via a standard input/output (I/O) interface exhibiting a data transfer rate that is less than a print rate of a laser print engine in said laser printer, said method comprising the steps of:

allocating a portion of random access memory (RAM) in said laser printer for use as a buffer to store said raster formatted pixel image data, said portion including an initial portion sized to hold an initial quantity of raster formatted pixel image data comprising a portion of a page;

commencing operation of said laser print engine to print a page from data stored in said buffer only when said initial quantity of said raster formatted pixel image data is stored in said initial portion of said buffer, said data transfer rate enabling transfer over said standard I/O interface to said buffer of sufficient additional said raster formatted pixel image data to enable said print engine to complete printing of said page, without stopping after said initial quantity of said raster formatted pixel image data has been printed.

6. The method as recited in claim 5 further comprises a step that occurs prior to said allocating step, said step comprising:

receiving from said connected computer a value that specifies the size of said initial portion of said buffer.

7. The method as recited in claim 6 wherein said laser printer performs the further steps of:

activating in a default mode, a first print control procedure which converts print control commands and data in a printer control language, received via said standard I/O input interface, into raster formatted pixel image data for printing on said page; and performing in response to a command from said computer, a print control procedure that enables said raster formatted pixel image data received at said standard input/output interface, to be processed as recited in said activating, allocating and commencing operation steps.

8. The method as recited in claim 6 wherein said connected computer provides a header that accompanies said raster formatted pixel image data, a said header specifying height, width and placement of said raster pixel image date on a page.

9. The method as recited in claim 8, further including the step of:

extracting from said header accompanying said raster formatted pixel image data, information specifying height, width and placement of data on a page, and employing said information to control operation of said laser print engine.

* * * * *